Nov. 16, 1948.  S. M. RANSOME  2,454,087
INTERNAL THREAD MILLING MECHANISM
Filed April 19, 1945  2 Sheets-Sheet 1

INVENTOR
Stafford M. Ransome
BY
Carlson, Pitzner, Hubbard & Wolfe
ATTORNEYS

Nov. 16, 1948.  S. M. RANSOME  2,454,087
INTERNAL THREAD MILLING MECHANISM
Filed April 19, 1945  2 Sheets-Sheet 2

INVENTOR
Stafford M. Ransome
BY
Carlson, Pitzner, Hubbard & Wolfe
ATTORNEYS

Patented Nov. 16, 1948

2,454,087

UNITED STATES PATENT OFFICE 2,454,087

INTERNAL THREAD MILLING MECHANISM

Stafford M. Ransome, Rockford, Ill., assignor to Barber-Colman Company, Rockford, Ill., a corporation of Illinois Application April 19, 1945, Serial No. 589,128

9 Claims. (Cl. 90—11.64)

The present invention relates generally to improvements in internal milling mechanisms, and has particular reference to a new and improved mechanism adapted particularly for the milling of internal threads.

In external milling operations, no difficulty is ordinarily encountered in supporting the cutter at both ends in order to provide adequate rigidity and support against side thrust. However, in internal milling operations, in which the cutter and work axes are laterally offset, as for example in the milling of internal screw threads with the use of a multiple rib thread mill, the end of the cutter remote from the spindle is located within or inwardly of the workpiece and, hence, is not ordinarily accessible for outboard support. Consequently, it has been the practice in conventional methods of milling internal threads to extend the cutter into the work holder without providing any support for the free end other than that afforded at the other end by the drive spindle.

The primary object of the present invention is to obviate the foregoing difficulty by providing a novel support for the projecting end of the milling cutter within the work holder.

Another object is to provide a new and improved internal milling mechanism which affords an outboard support for the cutter to obtain greater rigidity of the parts, increased cutter life, and greater accuracy and improved finish in the work.

A further object is to provide a novel internal thread milling mechanism in the form of an attachment adapted to be used on a conventional gear hobbing machine to adapt the latter for internal thread milling.

Other objects and advantages will become apparent as the description proceeds.

Figure 1:
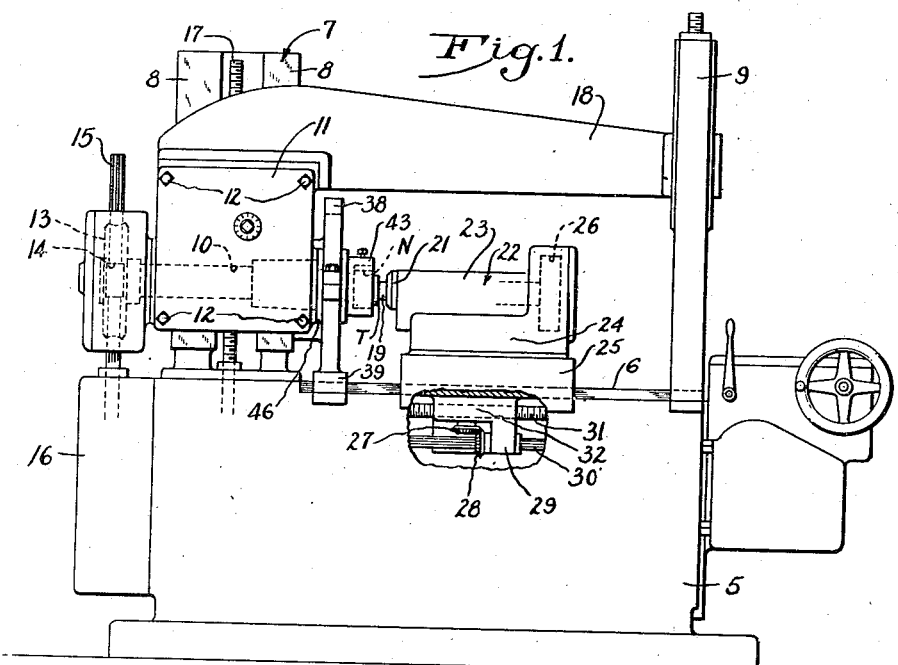
Figure 1 is a fragmentary front elevational view of a conventional hobbing machine provided with an internal thread milling mechanism embodying the features of my invention.

Referring more particularly to the drawings, the internal thread milling mechanism, constituting the exemplary embodiment of the invention, may be utilized in any suitable type of machine capable of supporting the work, such for example as a nut N, and a cutting tool, such for example as a thread mill T, in operative cutting engagement, and for translation to provide relative transaxial feed, relative axial translation and relative cutting rotation in timed relation to said translation, either by rotating the work or by revolving the tool about the axis of the work. In the present instance, the thread milling mechanism is shown as an attachment for a conventional gear hobbing machine.

The hobbing machine, in the particular form shown, comprises a bed 5 provided on the top with longitudinal ways 6. Mounted on one end of the bed 5 is an upright column 7 having vertical ways 8 on the front. An outboard column 9 is mounted on the other end of the bed 5.

The workpiece N is removably supported on one end of a horizontal work spindle 10 which is journaled in a work slide 11 mounted for vertical adjustment on the ways 8 and adapted to be secured in position of adjustment by suitable clamping means 12. The other end of the spindle 10 is adapted to be connected to a suitable drive. In the present instance, a worm wheel 13, fixed on the outer end of the spindle 10, meshes with a worm 14 slidably splined on a vertical shaft 15 to establish a connection with the latter in all vertical positions of adjustment of the work slide 11. The lower end of the spline shaft 15 is rotatably anchored in a gear transmission housing 16 for connection to a suitable source of power (not shown). The work slide 11 is supported and adjustable up and down by an elevating screw 17 connected thereto in the usual manner. The lower end of the screw 17 is suitably journaled in the bed 5, and adapted for connection to a suitable source of power (not shown).

To provide rigidity, an overarm 18 is secured at one end to the top of the work slide 11, and extends longitudinally over the ways 6 of the bed 5. The other end of the overarm 18 is slidably guided within the outboard column 9.

The cutter or tool T may be mounted on an arbor 19 removably secured in a tapered socket 20 in one end of a tool spindle 21 supported for rotation and for translation along the bed ways 6 by a suitable tool head 22. This tool head may be of any suitable type, and in the present instance comprises a spindle housing 23 supported on a swivel 24. The latter, in turn, is mounted on a tool slide 25 supported on the bed ways 6 for translation axially of the work spindle 10.

The tool spindle 21 is adapted to be driven by any suitable means, and in the present instance is connected for rotary drive from a gear 26 through a transmission (not shown) within the tool head 22 terminating in a bevel gear 27 on the axis of the swivel 24. The gear 27 meshes with a bevel gear 28 rotatably anchored in a lug 29 on the underside of the tool slide 25 for translation therewith. The gear 28 is slidably splined on a horizontal shaft 30 supported in and extending through the bed 5, and adapted for connection to a suitable source of power (not shown). A horizontal feed screw 31, also supported in and extending through the bed 5, is in threaded engagement with a nut 32 integral with the lug 29 on the underside of the tool slide 25. The feed screw 31 is adapted to be connected to a suitable source of power (not shown), and when rotated serves to translate the tool head 22 and hence the tool T axially of the work spindle 10 and the work N.

Figure 2:
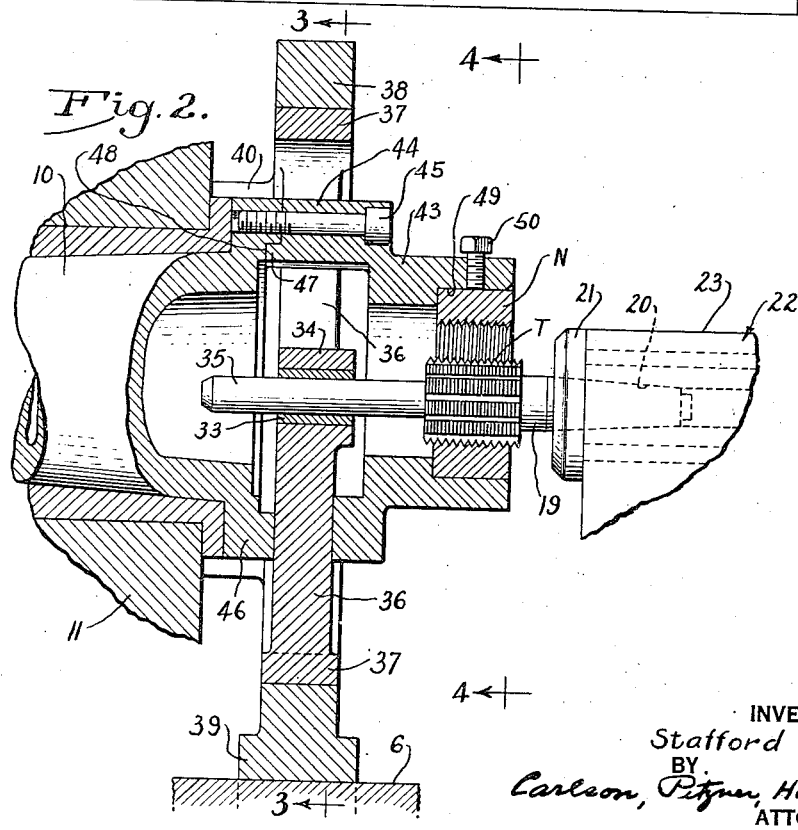
Fig. 2 is a fragmentary vertical sectional view on an enlarged scale, taken substantially along line 2—2 of Fig. 3, of the internal thread milling mechanism.
Figure 3:
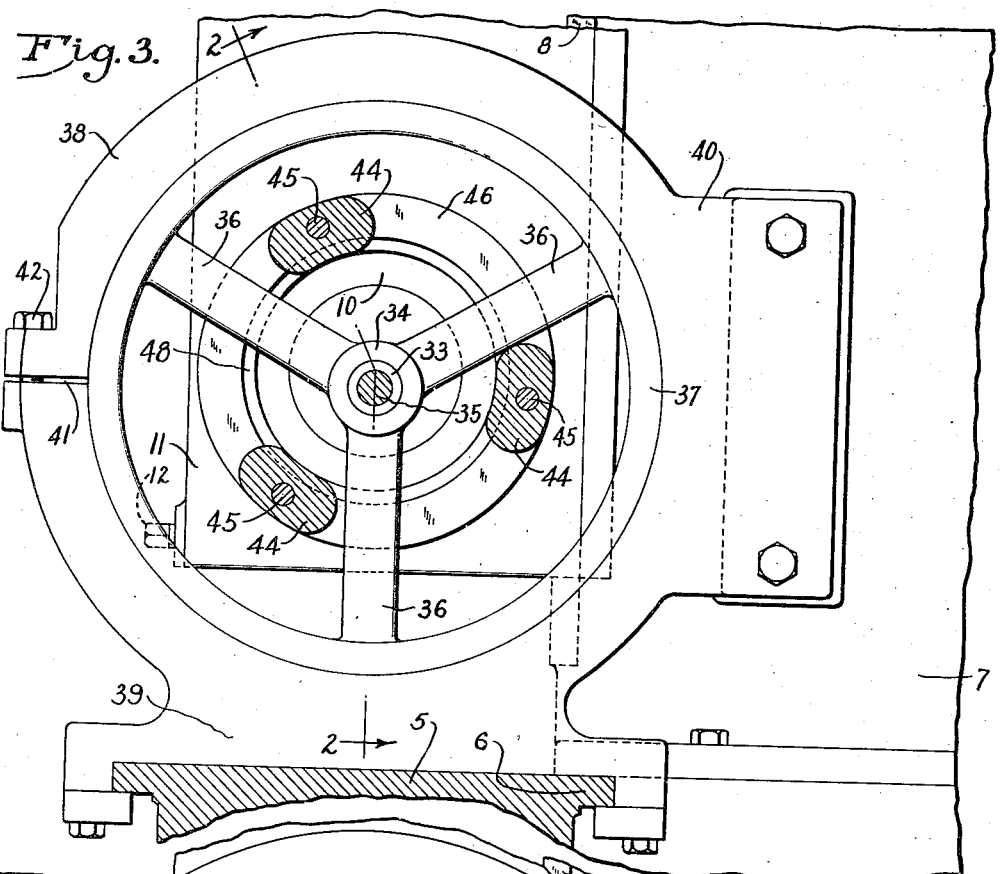
Fig. 3 is a fragmentary transverse vertical sectional view taken substantially along line 3—3 of Fig. 2.
Figure 4:
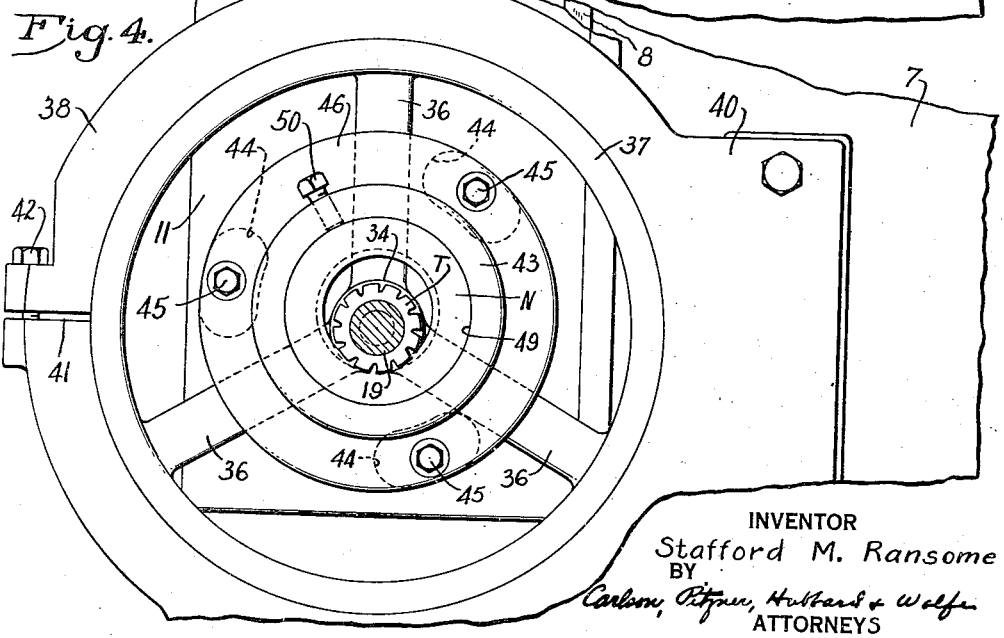
Fig. 4 is a view similar to Fig. 3, but taken substantially along line 4—4 of Fig. 2 to show the internal thread milling mechanism in end elevation, the parts being shown rotated approximately 30° from the position in Fig. 3.

The various drives for the shafts 15 and 30 and the feed screws 17 and 31, and the controls therefor, per se form no part of the present invention and, therefore, are not disclosed in detail. It is sufficient to state that in a normal internal thread milling operation the tool head 22 is translated from an idle position to the left in order to advance the tool T into the workpiece N. Then, while the tool T is being rotated at cutting speed, the work slide 11 is fed upwardly to effect relative movement of the tool transaxially into cutting engagement with the work to the desired depth. In this position, the axes of the work N and the tool T are parallel, but relatively offset as shown in Figs. 2 and 4. Thereafter, the work spindle 10 is driven slowly to rotate the work N through slightly more than one revolution, and the tool head 22 is fed to the left in timed relation to the work rotation as determined by the lead of the thread to be milled. The tool T is of the type commonly known as a thread mill, and comprises a plurality of axially spaced annular rows of relieved teeth, each row being adapted to cut one thread convolution, with a slight overlap between successive convolutions, so that upon rotation of the work N through one entire revolution, the complete screw thread will be milled from end to end.

The present internal thread milling mechanism provides an outboard bearing support for the free or outer end of the cutting tool T inwardly of the workpiece N and in any axial position of the tool and any relative transaxial position of the workpiece.

The support comprises a bushing 33 rigidly secured within a tubular boss 34, and adapted to receive an axial rod or pilot 35 on the leading end of the tool arbor 19. The boss 34 forms the central hub of a spider comprising a plurality of peripherally spaced radial arms 36 connected at their outer ends to a concentric bearing ring 37. In the present instance, three arms spaced approximately 120° apart are provided. The ring 37 extends in freely spaced relation about the exterior of the work spindle 10, and is supported for rotation on a stationary part of the machine. More particularly, the ring 37 is rotatably embraced and supported by a stationary outer ring 38 having a base 39 mounted on and adapted to be clamped to the bed ways 6, and also having an integral bracket 40 extending to one side and rigidly bolted to the upright column 7. The outer ring 38 is split at 41, and the split ends are adapted to be contracted by a clamp bolt 42 to maintain the ring into close bearing engagement with the ring 37.

To accommodate connection of the internal boss 34 by the arms 36 with the outer ring 37, the workpiece N is adapted to be mounted in a work holder 43 having a plurality of peripherally spaced connecting lugs 44 on one end removably secured by bolts 45 to an annular mounting flange or nose plate 46 on the end of the spindle 10.

The connecting lugs 44 preferably correspond in number and spacing to the arms 36 and extend freely between the latter. Each connecting lug 44 is formed with an arcuate end projection 47 interfitting with an annular notch 48 in the inner peripheral edge of the mounting plate 46, and the three projections 47 thus act as a pilot to center the work holder 43.

The work holder 43 may be of any suitable type and form depending on the nature of the work, and in the present instance comprises a tubular sleeve formed in the outer end with a counterbore 49 to receive and seat the workpiece N. A set screw 50 is provided for securing the workpiece N in position.

The outwardly projecting arms 36 of the spider for supporting the free end of the cutting tool T, and also the connecting lugs 44 on the inner end of the work holder 43, are widely spaced so as to permit relative transaxial adjustment between the work and tool spindles 10 and 21. As a result, considerable lost motion is provided between the spider and the work holder 43, but the latter upon being rotated will, through engagement of the lugs 44 with the arms 36, cause the ring 37 to rotate regardless of whether or not the central boss 34 is coaxial with the spindle 10. The bearing 33 is always maintained in axial alinement with the tool spindle 21, and the pilot 35 is slidable and rotatable therein to afford an outboard support for the tool T within the holder 43 and the spindle 10. Due to the rigidity thus obtained, cutters of considerable length can be employed, and in any event the cutter life is increased and the accuracy and finish of the work is improved.

I claim as my invention:

1. An internal thread milling mechanism comprising, in combination, a rotary work spindle supported for transaxial movement, a work holder adapted to support a workpiece and having a plurality of peripherally spaced connecting lugs removably secured to one end of said spindle, a rotary tool spindle mounted for axial feed in a direction generally parallel to the axis of said work spindle and adapted to support a rotary cutting tool for engagement with the interior of the workpiece, said tool spindle having an axial pilot adapted to extend longitudinally from the free end of said cutter inwardly of the workpiece, an outer bearing ring freely encircling the exterior of said work holder, a coaxial boss slidably and rotatably receiving said pilot and a plurality of arms connecting said boss to said ring and extending freely outwardly between said connecting lugs, and a stationary bearing support for said ring.

2. An internal thread milling mechanism comprising, in combination, a work spindle and a parallel tool spindle mounted for relative axial feed and for relative transaxial adjustment, a hollow work holder secured to one end of said work spindle and adapted to support a workpiece in coaxial relation, said work holder being formed with a plurality of peripherally spaced openings, an arbor secured coaxially to said tool spindle for supporting a rotary cutting tool and having a cylindrical pilot extending into said work holder, an inner bearing within said work holder and adapted to slidably and rotatably receive said pilot and having arms projecting outwardly through said openings, a concentric outer bearing member located externally of said work holder and connected with said arms to support said inner bearing, and a bearing support for said member, said member being rotatable through engagement with said work holder upon rotation of said work spindle and in any relative transaxial position of said spindles.

3. An internal thread milling mechanism comprising, in combination, a rotary work spindle supported for transaxial movement, a coaxial work holder adapted to support a workpiece and having three peripherally spaced connecting lugs centered on and removably secured to one end of said spindle, a rotary tool spindle mounted for axial feed in a direction parallel to the axis of said work spindle and adapted to support a rotary cutting tool within said work holder, an axial cylindrical pilot carried by said tool spindle and adapted to extend from the free end of said cutter into said work holder, a rotary spider for receiving and supporting said pilot, said spider comprising a bearing ring freely encircling the exterior of said work holder, a coaxial boss for slidably and rotatably receiving said pilot and three radial arms extending from said boss freely outwardly between said respective connecting lugs to said bearing ring, and a stationary supporting ring encircling said bearing ring, said supporting ring being split and adapted for contraction into bearing engagement with said bearing ring.

4. An internal milling mechanism comprising, in combination, a work spindle and a parallel tool spindle mounted for relative axial feed and for relative transaxial adjustment, a hollow work holder secured to one end of said work spindle and having work gripping means adapted to support a workpiece in coaxial relation, said work holder being formed with an opening extending from the interior to the exterior and located inwardly of said work gripping means, an arbor secured coaxially to said tool spindle for supporting a rotary cutting tool and having an axial pilot adapted to extend into said work holder, a bearing within said work holder and for slidably and rotatably receiving said pilot and having an arm projecting outwardly through said opening, and means located externally of said work holder and connected with said arm to support said bearing for rotation with said work holder in any relative transaxial position of said spindles.

5. An internal milling mechanism comprising, in combination, a rotary work spindle having a hollow holder on one end for supporting a workpiece and a parallel tool spindle for supporting a rotary tool, said spindles being mounted for relative axial feed and for relative transaxial adjustment, an axial pilot on said tool spindle, a bearing in said holder adapted slidably and rotatably to receive said pilot, and means extending through the peripheral wall of said holder and mounted externally of said holder for supporting said bearing in any relative transaxial position of said spindles.

6. In an internal milling mechanism comprising, in combination, a frame structure, a rotary work spindle and a parallel tool spindle mounted on said structure for relative axial feed and for relative transaxial adjustment, a hollow work holder secured to one end of said spindle for rotation therewith and adapted to support a workpiece in coaxial relation, said work holder being formed with an opening in the peripheral wall extending from the interior to the exterior and located axially inwardly of the normal position occupied by the workpiece, a sleeve bearing located within said work holder and adapted slidably and rotatably to receive an axial pilot on the end of an arbor adapted to be secured coaxially to one end of said tool spindle for supporting a rotary cutting tool, said bearing having an arm projecting outwardly through said opening, and means mounted on said frame structure externally of said work holder and connected with said arm to support said bearing for rotation with said work holder in any relative transaxial position of said spindles.

7. A milling mechanism comprising, in combination, a frame structure, peripheral rotary spindles mounted on said structure respectively for supporting a work element and a tool element, one of said spindles being supported for rotation and having a hollow holder on one end for supporting one of said elements which is hollow to receive the other of said elements upon relative axial movement of said spindles, said spindles being mounted for relative axial feed and for relative transaxial adjustment, an axial pilot on the end of the other of said spindles and projecting into said rotary holder axially inwardly of said hollow element, a sleeve bearing in said one spindle adapted slidably and rotatably to receive said pilot in any relative transaxial position of said spindles, and means mounted on said base structure externally of said holder and having an arm extending through the peripheral wall of said holder for supporting said bearing.

8. In an internal milling mechanism comprising, in combination, a frame structure, a first spindle mounted on said structure for rotation and for transaxial movement, a hollow holder having a peripheral opening and being removably secured to one end of said spindle, a second spindle mounted on said structure for axial feed in a direction generally parallel to the axis of said first spindle, said holder and said second spindle being adapted to support work and tool elements of which the element in the holder is hollow and adapted to receive the element on said second spindle, an outer rotary bearing ring freely encircling the exterior of said holder, a boss coaxial with said ring and located within said holder and adapted slidably and rotatably to receive an axial pilot adapted to be provided on said second spindle, an arm rigidly connecting said boss to said ring and extending freely outwardly through said opening, and a stationary bearing support on said structure for said ring.

9. An internal material machining mechanism comprising, in combination, a hollow work holder adapted to be mounted for rotation and to support a hollow workpiece, a tool support adapted to support a machining tool within the holder for operative cutting engagement with the workpiece and adapted to support a pilot projecting inwardly from the tool, said holder and tool support being adapted to be supported for relative transaxial adjustment and for relative axial adjustment, a bearing in the holder adapted slidably and rotatably to receive the pilot, and means extending through the peripheral wall of the holder and adapted to be mounted externally of the holder for supporting the bearing in any relative transaxial position of the holder and the tool support.

STAFFORD M. RANSOME.

REFERENCES CITED

The following references are of record in the file of this patent:

UNITED STATES PATENTS

| Number | Name | Date |
|---|---|---|
| 2,169,467 | Leisner | Aug. 15, 1939 |
| 2,228,498 | Young | Jan. 14, 1941 |